Figure 1:
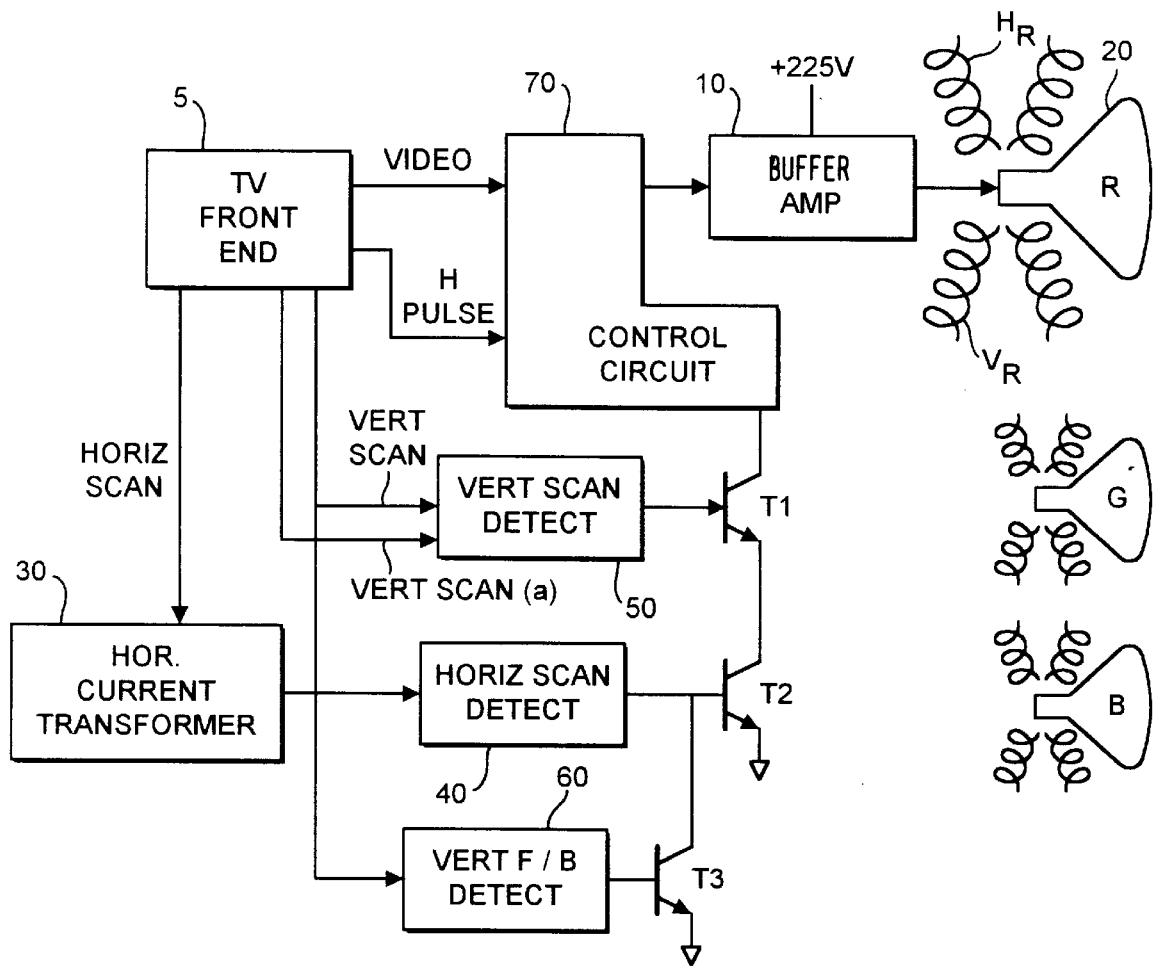

United States Patent [19]
George

[11] Patent Number: 5,856,730
[45] Date of Patent: Jan. 5, 1999

[54] SCAN LOSS DETECTOR

[75] Inventor: John Barrett George, Carmel, Ind.

[73] Assignee: Thomson Consumer Electronics, Inc., Indianapolis, Ind.

[21] Appl. No.: 806,968

[22] Filed: Feb. 26, 1997

[51] Int. Cl.[6] .............. G09G 1/04; H01J 29/52; H04N 5/68
[52] U.S. Cl. .................. 315/386; 315/381; 348/378
[58] Field of Search .................. 315/386, 384, 315/381; 348/634, 635, 173, 378, 380

[56] References Cited

U.S. PATENT DOCUMENTS

| | | | |
|---|---|---|---|
| 3,399,324 | 8/1968 | Brown | 315/381 |
| 3,501,670 | 3/1970 | Johnston et al. | 315/384 |
| 3,555,348 | 1/1971 | Martin | 315/20 |
| 3,810,024 | 5/1974 | Meacham | 315/386 |
| 4,176,302 | 11/1979 | Inoue et al. | 315/397 |
| 4,289,994 | 9/1981 | Beaumont et al. | 315/371 |
| 4,297,619 | 10/1981 | Kiteley | 315/381 |
| 4,402,029 | 8/1983 | Fujita | 361/90 |
| 4,642,532 | 2/1987 | Hoover | 315/386 |
| 4,749,919 | 6/1988 | Beaumont et al. | 315/386 |
| 4,754,206 | 6/1988 | Sorensen | 315/411 |
| 5,034,665 | 7/1991 | Wignot et al. | 315/386 |
| 5,036,257 | 7/1991 | Norman et al. | 315/381 |
| 5,036,260 | 7/1991 | George | 315/384 |
| 5,111,119 | 5/1992 | Truskalo et al. | 315/386 |
| 5,255,147 | 10/1993 | Oh | 361/93 |
| 5,313,146 | 5/1994 | Koblitz | 315/403 |

FOREIGN PATENT DOCUMENTS

| | | | |
|---|---|---|---|
| 05223281A1 | 1/1993 | European Pat. Off. | H04N 3/20 |
| 01 228271A | 9/1989 | Japan | H04N 3/20 |
| 04 312072A | 11/1992 | Japan | H04N 3/20 |
| 2 288 960 | 11/1995 | United Kingdom | H04N 3/20 |

OTHER PUBLICATIONS

Technical Guide TH–25BF1, National/Panasonic, Oct. 1996.

Primary Examiner—Gregory C. Issing
Attorney, Agent, or Firm—Joseph S. Tripoli; Joseph J. Laks; Sammy S. Henig

[57] ABSTRACT

A display system includes a kinescope. A horizontal scan detector is coupled to a source of a horizontal scan current signal and detects a loss of horizontal scanning. In addition, a vertical scan detector is coupled to a source of a vertical scan current signal including a feedback path and detects a loss of vertical scanning. A vertical feedback detector is also coupled to the vertical scan current signal source, and detects a failure of the feedback path in the vertical scan current signal source. A controllable kinescope driver circuit, coupled to the kinescope, the horizontal scan detector, the vertical scan detector and the vertical feedback detector, blanks the kinescope if the horizontal scan detector detects a loss of horizontal scanning, the vertical scan detector detects a loss of vertical scanning or the vertical feedback detector detects a failure of the feedback path.

8 Claims, 5 Drawing Sheets

SCAN LOSS DETECTOR

The present invention relates to a detector detecting when scanning display device has been lost.

In some known display applications, kinescopes are used to generate an image in response to a video signal representing that image. A kinescope operates by scanning an electron beam in a raster across a screen having light producing phosphors on it, and modulating the intensity of the electron beam to vary the light output from the phosphors, thus producing an image on the screen. It is known that a high energy electron beam continually concentrated on a small area of the screen phosphors will burn the phosphors in that area, ruining the kinescope.

Such a situation can occur in known projection television (PTV) systems. In such systems, three kinescopes, one for each color component: red, green and blue, are used. These three kinescopes are raster-scanned synchronously, and the three color component video signals, representing the desired composite image, are supplied to corresponding kinescopes. The color component images from these three kinescopes are combined by an optical system and projected onto a passive display screen to form the composite video image. Because the images of the kinescopes are projected onto a passive display screen, and not viewed directly from their phosphors, the images produced by those kinescopes must have high light output. Consequently, the electron beams used to produce these images must have high energy.

So long as the raster is being scanned properly in each kinescope, the high energy electron beam doesn't stay in one area long enough to burn any phosphors and the kinescope is safe. However, if the scanning of the electron beam in the raster breaks down in either or both of the horizontal and the vertical directions, the electron beam will begin to scan a vertical line if horizontal scanning is lost, a horizontal line if vertical scanning is lost, or a single spot if both vertical and horizontal scanning is lost. This continual concentration of electron beam energy on a small area of the screen will burn the phosphors in that area and will ruin the kinescope. Kinescopes are expensive and hard to replace, so it is desirable to prevent a scanning failure from ruining the kinescopes.

Prior art PTV systems have included detectors to detect when vertical and/or horizontal scanning has been lost. When a loss of scanning has been detected, the kinescope driver circuit, coupling the video signal to the kinescope electron beam gun, is conditioned to turn off the electron beam. More specifically, as is well known, the horizontal scan current for the horizontal deflection coils is generated by a winding coupled to a flyback transformer in response to a horizontal synchronization component from the video signal. Another winding on the flyback transformer is used to generate heater filament power for the kinescopes. Prior art horizontal scan detectors were coupled to the heater filament winding of the flyback transformer. If the horizontal scan detector detected a proper signal from this winding, it was assumed that horizontal scanning was present; if the signal at this winding was not proper, it was assumed that horizontal scanning was lost, and the kinescope driver was conditioned to turn off the electron beam current in the kinescopes.

The vertical scan current was generated by a vertical scan current amplifier in response to a vertical synchronization component in the video signal. Such a vertical scan current amplifier included an output terminal coupled to one terminal of the vertical deflection coils, and a feedback terminal coupled to the other terminal of the vertical deflection coils through a DC blocking feedback capacitor. A sensing resistor is coupled in the feedback loop. The sensing resistor sensed the current flowing through the vertical deflection coils. A vertical scan detector sensed the voltage across the sensing resistor. If the vertical scan detector detected a proper signal at a terminal of the sensing resistor, it was assumed that vertical scanning was present; if the signal at the terminal of the scanning resistor was not proper, it was assumed that vertical scanning was lost, and the kinescope driver was conditioned to turn off the electron beam current in the kinescopes.

There are, however, several failure modes which the prior art horizontal and vertical scan detectors, described above, cannot detect. First, because the horizontal scan detector is coupled to a winding (heater filament) of the flyback transformer and not directly to the deflection winding, it is possible that the signal on that winding will be proper, while no horizontal deflection current is being supplied to the horizontal deflection coils. The prior art vertical scan detect or monitors the vertical deflection coils, and if an open circuit occurs in them, it will properly detect that, and turn off the electron beam in the kinescopes. However, if an open circuit occurs in the feedback path between the current sensing resistor and the feedback terminal of the vertical scan current amplifier or if the sensing resistor is disconnected, the vertical scan detector, coupled to the sensing resistor, will erroneously detect a vertical rate signal, even though no vertical deflection current is flowing through the vertical deflection coils.

In these cases, vertical and/or horizontal scanning could be lost, but not detected by the vertical and/or horizontal scan detectors. The undetected loss of scanning would allow unscanned electron beams to burn the phosphors on the kinescopes, ruining them. An improved scan detection system is desirable which will detect these failures, and prevent damage to kinescopes which might otherwise happen from these failures.

In accordance with principles of the present invention, a display system includes a kinescope. A horizontal scan detector is coupled to a source of a horizontal scan current signal, and detects a loss of horizontal scanning. In addition, a vertical scan detector is coupled to a source of a vertical scan current signal including a feedback path, and detects a loss of vertical scanning. A vertical feedback detector is also coupled to the vertical scan current signal source, and detects a failure of the feedback path in the vertical scan current signal source. A controllable kinescope driver circuit, coupled to the kinescope, the horizontal scan detector, the vertical scan detector and the vertical feedback detector, blanks the kinescope if the horizontal scan detector detects a loss of horizontal scanning, the vertical scan detector detects a loss of vertical scanning or the vertical feedback detector detects a failure of the feedback path.

A video display apparatus embodying an aspect of the invention includes a deflection amplifier responsive to an input signal at a frequency related to a deflection frequency for generating an output voltage coupled to a deflection winding. A deflection current is produced that is capable of producing an electron beam scanning in a cathode ray tube. The output voltage is outside a normal operation range when a scan loss condition occurs. A protection circuit is responsive to a first scan loss indicative signal and to a second scan loss indicative signal for disabling a corresponding stage when one of the first and second scan loss indicative signals is generated. A first scan loss detector is responsive to the output voltage of the amplifier for sensing the output voltage and for generating the first scan loss indicative signal when the output voltage is outside the normal operation range. A second scan loss detector is responsive to the deflection current for sensing the deflection current and for generating the second scan loss indicative signal when the deflection current is outside a corresponding normal operation range.

Figure 2:
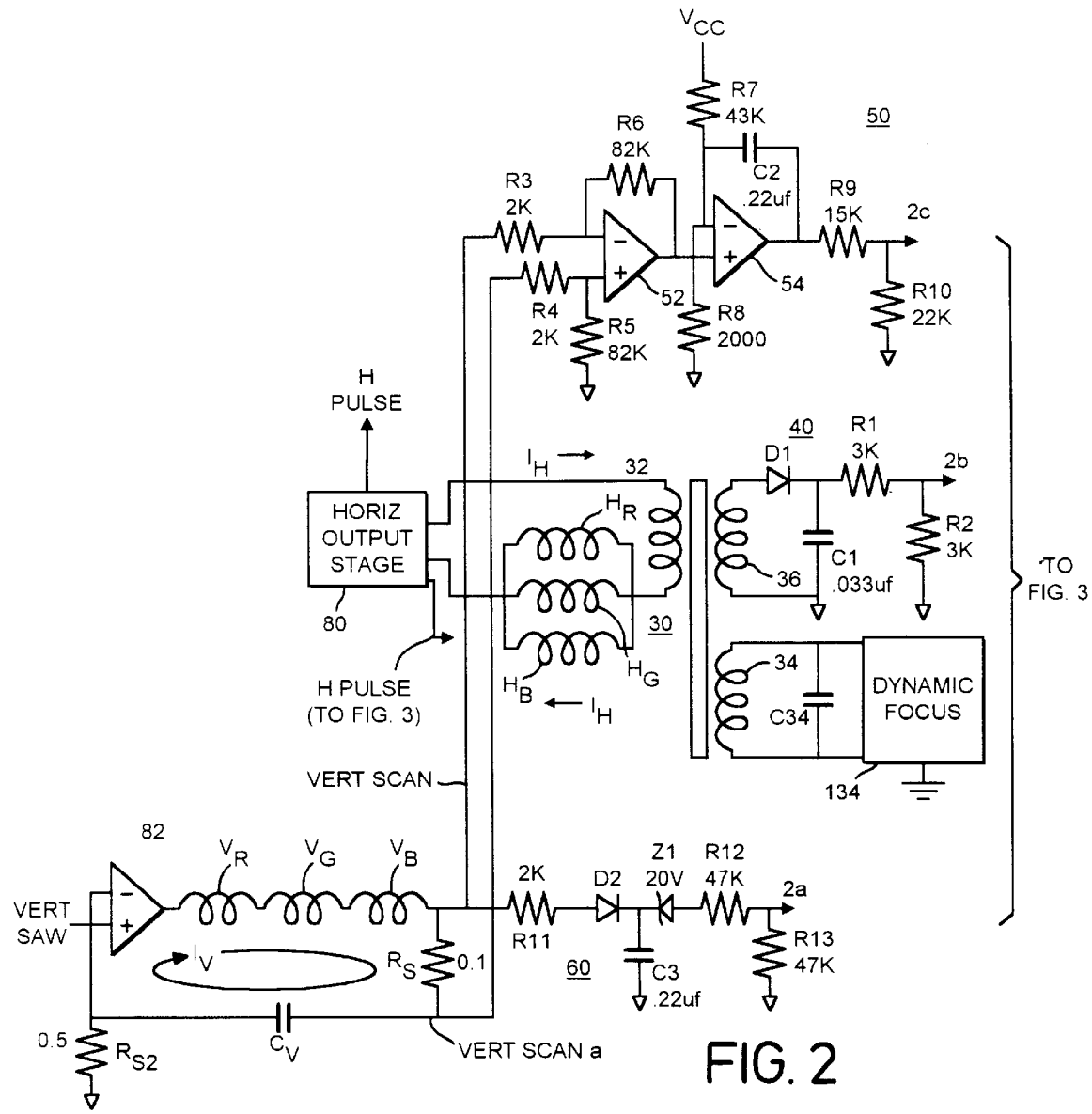
Figure 3:
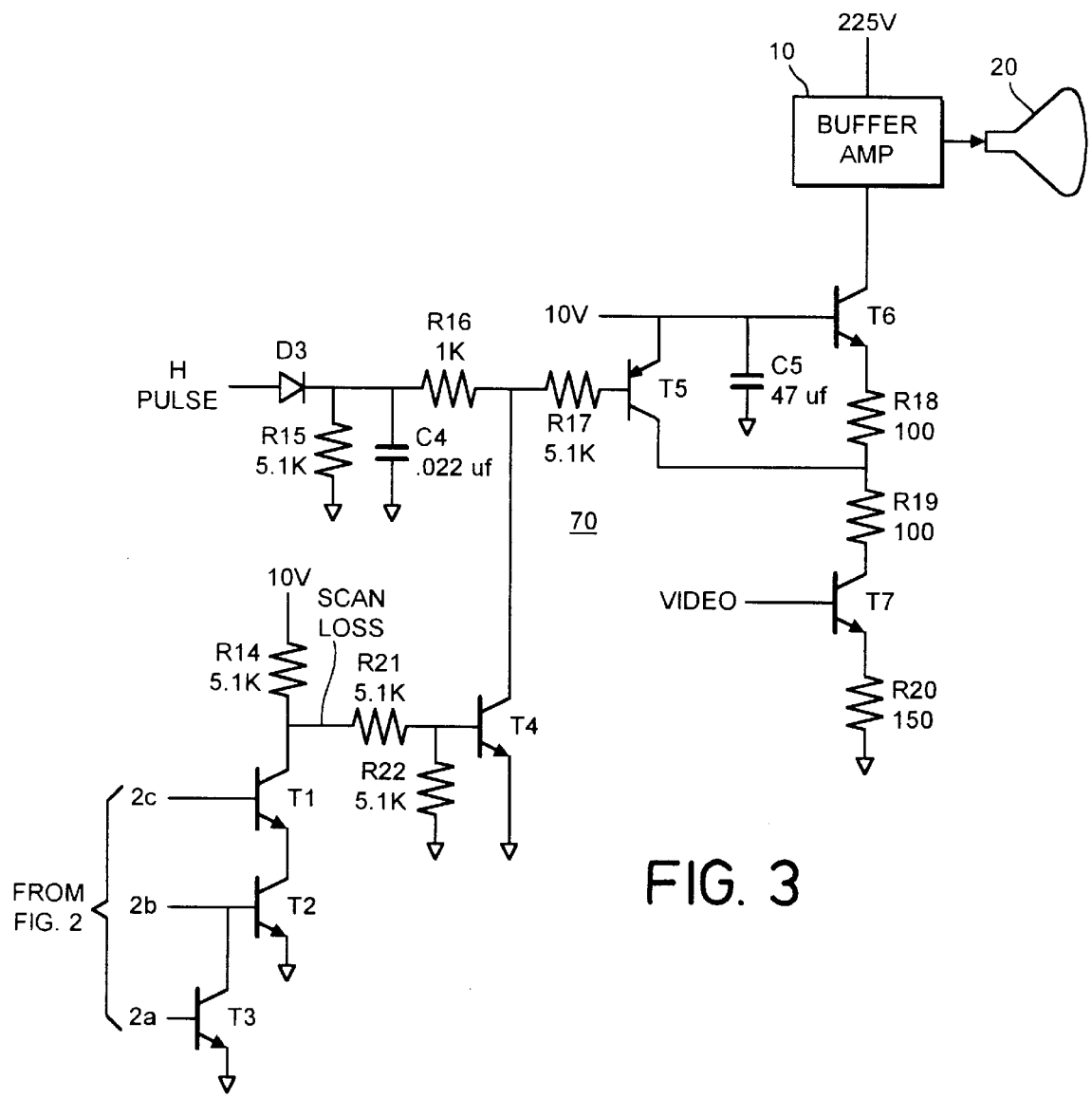
Figure 4:
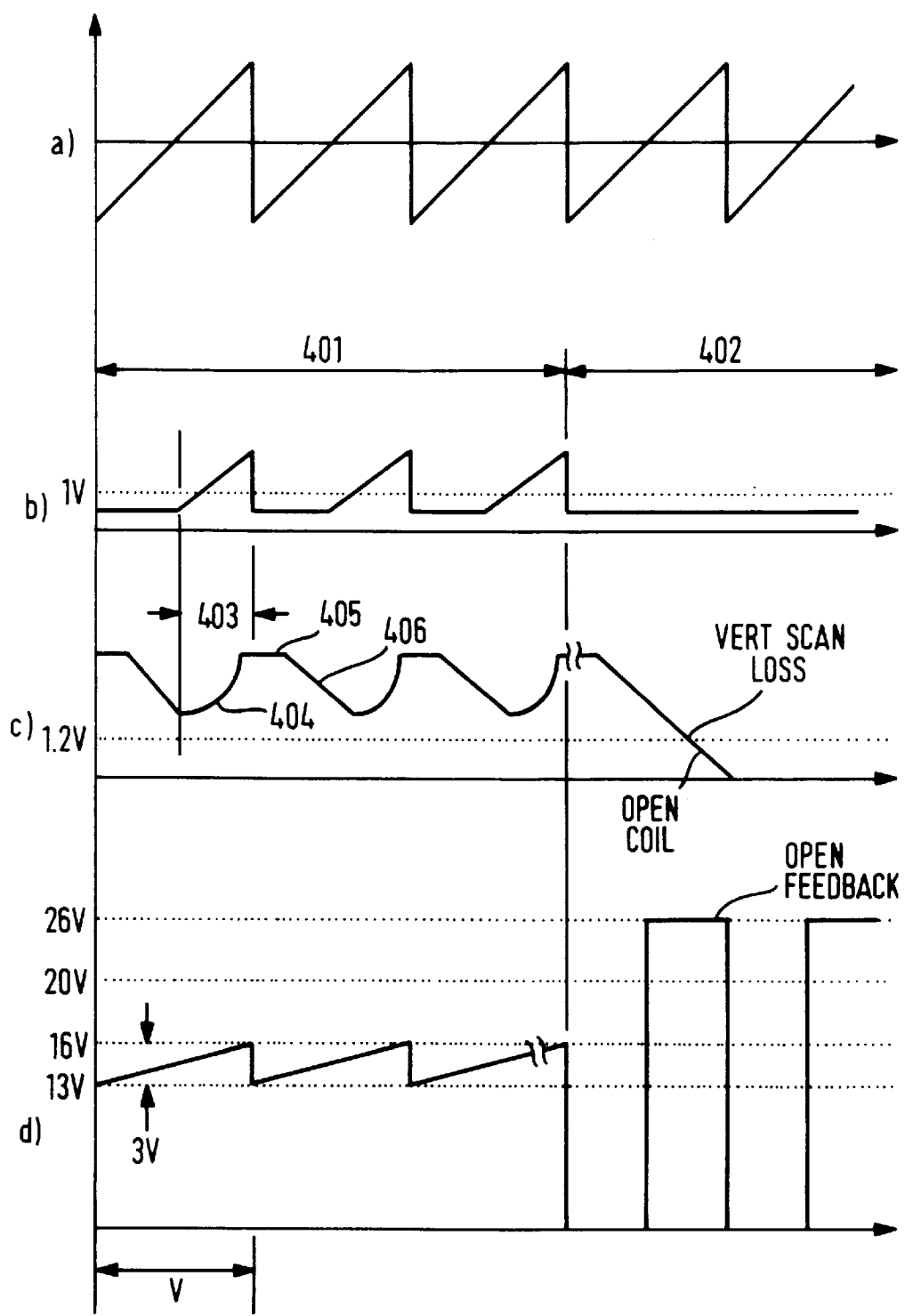
Figure 5:
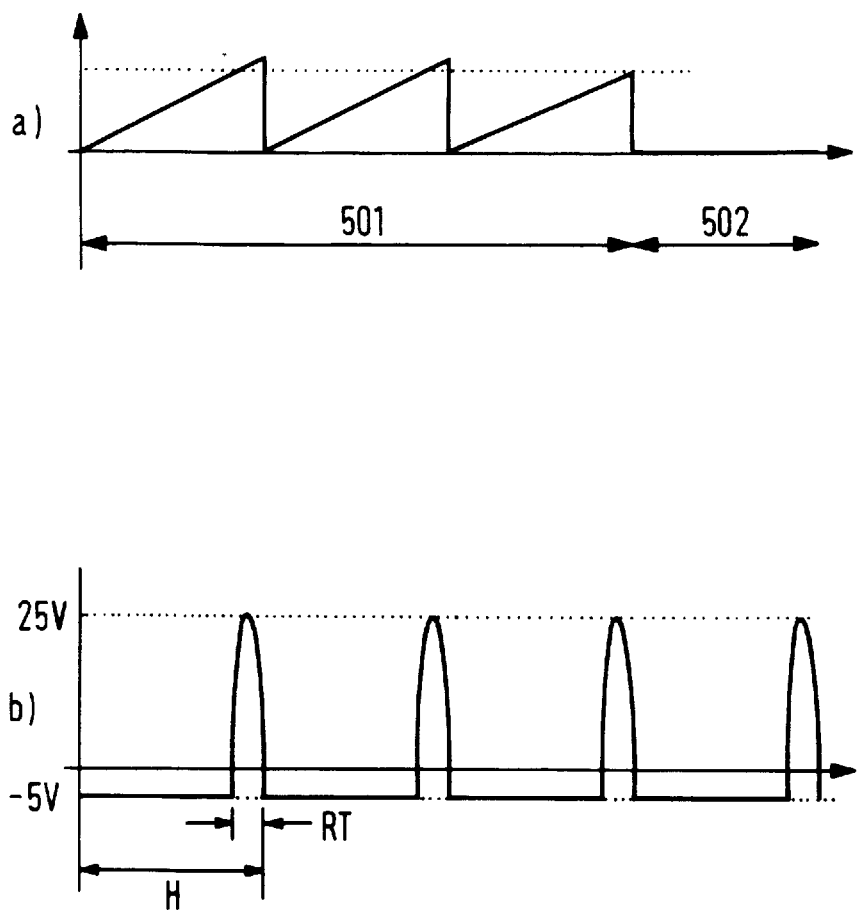

In the drawing:

FIG. 1 is a block diagram of a portion of a projection television system incorporating the present invention;

FIG. 2 is a more detailed diagram, partially in block form and partially in schematic form, of a horizontal scan detector 40, a vertical scan detector 50 and a vertical feedback detector 60 which may be used in the system illustrated in FIG. 1;

FIG. 3 is a more detailed diagram, partially in block form and partially in schematic form, of a control circuit which may be used in the system illustrated in FIG. 1; and FIGS. 4 and 5a–5b are waveform diagrams useful in understanding the operation of the diagrams illustrated in FIGS. 1, 2 and 3.

In the detailed description, FIGS. 1, 2 and 3 illustrate circuitry embodying the present invention. FIGS. 4 and 5a–5b are waveform diagrams useful in understanding the operation of the diagrams illustrated in FIGS. 1, 2 and 3. The waveform illustrated in FIGS. 4 and 5a–5b will be referred in the appropriate locations of the descriptions of FIGS. 1, 2 and 3, but will not be described separately.

FIG. 1 is a block diagram of a portion of a projection television (PTV) system incorporating the present invention. In FIG. 1, only those portions of the PTV system necessary for understanding the invention are illustrated. One skilled in the art will understand what other elements are necessary, and how to design, build and interconnect such elements with those illustrated.

A PTV system includes three kinescopes: a red kinescope, a green kinescope and a blue kinescope. These kinescopes produce optical images which are combined by an optical system (not shown) and projected on a display screen (also not shown). Each kinescope includes respective vertical and horizontal deflection coils to move the electron beam produced by an electron gun in the kinescope to produce an image producing raster. Each kinescope also receives a signal from a kinescope driver which controls the intensity of the electron beam as it traverses the raster, all in a known manner. FIG. 1 illustrates in detail only the red R kinescope 20, and illustrates the green G and blue B kinescopes in miniature only. One skilled in the art will understand that the green G and blue B kinescope have associated with them similar circuitry to that described below for the red R kinescope 20.

In FIG. 1, a television front end 5 receives a television program representative signal, e.g. from an antenna or cable, processes that signal and produces (among other signals) a red video component signal (VIDEO), a horizontal scan sawtooth current signal HORIZ SCAN (FIG. 5a), a voltage signal VERT SCAN (FIG. 4a) a voltage signal VERT SCAN(a), and a horizontal pulse signal H PULSE (FIG. 5b), all in a known manner. Signals VERT SCAN and VERT SCAN(a) are sawtooth signals, developed at a pair of terminals, respectively, of a resistor that is coupled in series with the vertical deflection coils, not shown in FIG. 1. The red video component signal VIDEO is coupled to a video input terminal of a control circuit 70. The horizontal pulse signal H PULSE is coupled to an H PULSE input terminal of the control circuit 70. A video output terminal of the control circuit is coupled to an input terminal of a kinescope buffer amplifier 10, which may, for example, be a push-pull (class B) amplifier of known design. An output terminal of the kinescope buffer amplifier 10 is coupled to a cathode electrode of the red R kinescope 20.

The horizontal deflection coils of the red R kinescope ($H_R$), the green G kinescope, and the blue G kinescope are coupled in parallel, in a known manner (and described in more detail below). The horizontal scan current signal HORIZ SCAN is coupled through the parallel connection of the horizontal deflection coil of the red R kinescope, $H_R$, and those of the green G and blue B kinescopes. The horizontal scan current signal is also coupled through a primary winding of a current transformer 30 (described in more detail below). A secondary winding of transformer 30 is coupled to an input terminal of a horizontal scan detector 40. An output terminal of the horizontal scan detector 40 is coupled to a base electrode of an NPN transistor T2.

The vertical deflection coils of the red R kinescope ($V_R$), the green kinescope and the blue kinescope are coupled in series in a known manner (and described in more detail below). The vertical scan signals VERT SCAN and VERT SCAN(a) are coupled from a vertical scan current amplifier, not shown in FIG. 1, that generates a deflection current in the series connection of the vertical deflection coil of the red kinescope, $V_R$, and those of the green G and blue B kinescopes. Signal VERT SCAN or VERT SCAN(a) is then coupled back to a feedback input terminal of the vertical scan amplifier through a network that includes a feedback capacitor and a current sensing resistor in a known manner (described in more detail below). Signal VERT SCAN is also coupled to the respective input terminals of a vertical scan detector 50 and a vertical feedback detector 60 in a manner to be described in more detail below. An output terminal of the vertical scan detector 50 is coupled to a base electrode of an NPN transistor T1, and an output terminal of the vertical feedback detector 60 is coupled to a base electrode of an NPN transistor T3.

A collector electrode of the transistor T1 is coupled to a SCAN LOSS input terminal of the control circuit 70. An emitter electrode of the transistor T1 is coupled to a collector electrode of the transistor T2. An emitter electrode of the transistor T2 is coupled to a source of a reference potential (ground). A collector electrode of the transistor T3 is coupled to the base electrode of the transistor T2 and an emitter electrode of the transistor T3 is coupled to ground.

In operation, the red buffer amplifier 10 operates to couple the red video component signal VIDEO from the television front end 5 to the cathode electrode of the red kinescope 20 in response to the signals at the H PULSE and SCAN LOSS input terminals under the control of the control circuit 70. The control circuit 70 analyzes the signals at the H PULSE and SCAN LOSS input terminals. If these signals indicate that scanning is present, the control circuit 70 operates to couple the red component signal VIDEO from the television front end 5 to the red kinescope 20. If, however, scanning becomes lost, the control circuit 70 operates to blank the red kinescope 20.

The horizontal pulse signal H PULSE is coupled to the filament of the red kinescope 20 in a known manner (not shown to simplify the figure). The horizontal pulse signal H PULSE (referring to FIG. 5b) is in the form of a pulse train at the horizontal rate (H) of the television signal. This pulse occurs during retrace periods (RT) of the horizontal line. The voltage amplitude of this pulse during the retrace period is around +25 volts, and is −5 volts otherwise. The control circuit 70 detects the presence of this pulse train (in a manner described in detail below). If the pulse train is not detected, then horizontal scanning is assumed to be lost, and the buffer amplifier 10 is blanked.

When horizontal scanning is detected by the horizontal scan detector 40, in a manner to be described in more detail below, it produces a voltage signal at its output terminal, and a ground potential signal otherwise. Similarly, when vertical scanning is detected by the vertical scan detector 50, also in a manner to be described in more detail below, it also produces a voltage signal at its output terminal, and a ground potential signal otherwise. Conversely, so long as the vertical scanning feedback loop is detected as operating properly, the vertical feedback detector 60, also in a manner to be described in more detail below, produces a signal at ground potential, and a voltage signal otherwise.

When the horizontal scan detector 40 and the vertical scan detector 50 both generate voltage signals, and the vertical feedback detector 60 produces a ground potential signal, indicating proper operation, the transistor T3 is conditioned to be non-conductive, isolating the base of the transistor T2 from ground, and the transistors, T1 and T2, are conditioned to become conductive, coupling the SCAN LOSS signal input terminal of the control circuit 70 to ground. In response, (and providing the H PULSE signal is properly detected, as described above), the control circuit 70 conditions the buffer amplifier 10 to couple the red video component signal from the television front end 5 to the red kinescope 20. This is the normal mode of operation.

If the horizontal scan detector 40 detects a malfunction in the horizontal scanning, it produces a ground potential signal at its output terminal, which conditions the transistor T2 to become non-conductive, isolating the SCAN LOSS input terminal of the control circuit 70 from ground. Similarly, if the vertical scan detector 50 detects a malfunction in the vertical scanning, it produces a ground potential signal at its output terminal, which conditions the transistor Ti to become non-conductive, also isolating the SCAN LOSS input terminal of the control circuit 70 from ground. Also similarly, if the vertical feedback detector 60 detects a malfunction in the feedback loop of the vertical deflection apparatus, it produces a voltage signal at its output terminal, which conditions the transistor T3 to become conductive. This couples the base electrode of the transistor T2 to ground, which conditions the transistor T2 to become non-conductive, isolating the SCAN LOSS input terminal of the control circuit 70 from ground. In all of these cases, the control circuit 70 operates to blank the red kinescope 20.

By blanking the red kinescope 20 when a scanning malfunction has been detected, damage to the kinescope from projecting a relatively high-energy non-scanning electron beam onto the phosphors in the kinescope is prevented.

FIG. 2 is a more detailed block diagram of horizontal scan detector 40, vertical scan detector 50 and vertical feedback detector 60 of FIG. 1. Similar symbols and numerals in FIGS. 1 and 2 indicate similar items or functions. In FIG. 2, a horizontal output stage 80 of the television front end 5 (of FIG. 1) produces the horizontal pulse signal H PULSE at a first output terminal, and a horizontal scan current signal $i_H$ at a pair of current terminals. These signals are generated using a flyback transformer (not shown) in a known manner. The horizontal scan current signal $i_H$ is coupled from one current terminal of the horizontal output stage 80, through the series connection of a primary winding 32 of current transformer 30 and the parallel connection of the red, green and blue horizontal deflection coils $H_R$, $H_G$, and $H_B$, to the second current terminal of the horizontal output stage 80 which may be at ground potential.

Because of transformer action of step-up transformer 30, capacitor C34 appears, or is reflected, across primary winding 32 as a large capacitive impedance. The value of the reflected capacitive impedance is directly related to the capacitance of capacitor C34 and to the square of the turns ratio of windings 34 and 32, respectively. The reflected capacitive impedance causes the voltage that is developed across primary winding 32 to be a horizontal rate, parabolic shape waveform. The result is that the voltage across each of windings 34 and 36 is parabolic. The voltage across capacitor C34 is coupled to a conventional dynamic focus generating circuit 134. Circuit 134 is coupled to a focus electrode of the CRT in a well known manner. Secondary winding 36 of the current transformer 30 produces the parabolic signal representing the horizontal scan current. This signal is peak detected in a known manner by diode D1 and capacitor C1. The peak detected signal is coupled to the base of the first transistor T2 through biasing resistors R1 and R2 in a known manner.

When current is flowing through the horizontal deflection coils $H_R$, $H_G$ and $H_B$, it also flows through the primary winding 32 of the current transformer 30 (FIG. 5a-501). In such a case, it also flows through the secondary winding 36. This in turn produces a non-zero signal across the capacitor C1 of the peak detector. So long as the voltage of the junction terminal between resistors R1 and R2 is greater than the $V_{BE}$ of the transistor T2, it conditions the transistor T2 to become conductive. Conversely, if no current is flowing through the horizontal deflection coils $H_R$, $H_G$ and $H_B$ (FIG. 5a-502), then none will flow through the primary winding 32 of the current transformer 30 and none will flow through secondary winding 36. In this case, the capacitor C1 will discharge through resistors R1 and R2 to ground pulling the base of the transistor T2 to ground (i.e. below $V_{BE}$. Transistor T2, thus, will be conditioned to be non-conductive, and the control circuit 70 (of FIG. 1) will blank the red kinescope 20 in a manner to be described in more detail below.

A vertical sawtooth signal VERT SAW (FIG. 4a) produced in the television front end 5 (of FIG. 1) is coupled to a non-inverting input terminal of a vertical scan current amplifier 82 of FIG. 2 of front end 5 of FIG. 1. An output terminal of the vertical scan current amplifier 82 of FIG. 2 is coupled to a first terminal of the series connection of the red, green and blue vertical deflection coils, $V_R$, $V_G$ and $V_B$. A second terminal of the series connection of the red, green and blue vertical deflection coils, $V_R$, $V_G$ and $V_B$ is coupled to a series connection of a first current sensing resistor $R_S$, a feedback capacitor $C_V$ and a second current sensing resistor $RS_2$. A junction terminal between a second electrode of the capacitor $C_V$ and resistor $RS_2$ is coupled to a feedback (inverting) input terminal of the vertical scan current amplifier 82.

A first electrode of a resistor R3 is coupled to a first electrode of the current sensing resistor $R_S$, and a second electrode of the resistor R3 is coupled to an inverting input terminal of a first operational amplifier 52. A first electrode of a resistor R4 is coupled to a second electrode of the current sensing resistor $R_S$, and a second electrode of the resistor R4 is coupled to a non-inverting input terminal of the first operational amplifier 52 and a first electrode of a resistor R5. A second electrode of resistor R5 is coupled to ground. An output terminal of the first operational amplifier 52 is coupled to a non-inverting input terminal of a second operational amplifier 54, and to a first electrode of a feedback resistor R6. A second electrode of feedback resistor R6 is coupled to the inverting input terminal of the first operational amplifier 52. A negative power terminal of the first operational amplifier 52 (not shown) is coupled to ground. The first operational amplifier 52, thus, operates as a differential amplifier.

An output terminal of the second operational amplifier 54 is coupled to a first electrode of a feedback integrator capacitor C2. A second electrode of the feedback capacitor C2 is coupled to an inverting input terminal of the second operational amplifier 54. A series connection of resistors, R7 and R8, is coupled between a source of operating potential $V_{CC}$ and ground. The junction of the resistors, R7 and R8 is also coupled to the inverting input terminal of the second operational amplifier 54, biasing the second operational amplifier. A negative power terminal of the second operational amplifier 54 (also not shown) is coupled to ground. The second operational amplifier 54, thus, operates as an integrator.

The output terminal of the second operational amplifier 54 is also coupled to a first electrode of a resistor R9. A second electrode of the resistor R9 is coupled to a first electrode of a resistor R10 and the base electrode of the transistor T1. A second electrode of the resistor R10 is coupled to ground.

Vertical scan loss may occur when a break occurs in the series connection of the red, green and blue vertical deflection coils, $V_R$, $V_G$ and $V_B$. The vertical scan detector 50 operates to detect the presence of vertical scan current through the red, green and blue vertical deflection coils, $V_R$, $V_G$ and $V_B$, and conversely the absence of such current in the event of a failure.

In operation, the vertical scan current amplifier 82 produces vertical scan current $I_V$ in response to the vertical sawtooth signal VERT SAW (FIG. 4a). The vertical scan current flows through the red, green and blue vertical deflection coils, $V_R$, $V_G$ and $V_B$, and then to ground through the sensing resistor $R_S$, the feedback capacitor $C_V$, which acts as a DC blocking capacitor and resistor $RS_2$. This current is a sawtooth current at a 60 Hz frequency generated in response to the vertical sawtooth signal VERT SAW at the non-inverting input terminal of the vertical scan current amplifier 82.

The sensing resistor $R_S$ produces a voltage signal (FIG. 4d-401) which corresponds to the current through the red, green and blue vertical deflection coils, $V_R$, $V_G$ and $V_B$ during normal operations (FIG. 4-401). In the illustrated embodiment, this signal is a 3 volt peak-to-peak sawtooth-shaped signal at a 60 Hz vertical frequency superimposed on a 13 volt DC component. This signal is amplified by the amplifier formed by the first operational amplifier 52. Because the negative power terminal of the first operational amplifier is coupled to ground, the output signal of the first operational amplifier cannot go lower than ground, and the output signal is clipped at, or just above, ground potential (FIG. 4b). In a preferred embodiment, the output of the first operational amplifier 52 is a 2 volt peak, positive-going series of sawtooth-shaped pulses at a 60 Hz frequency, so long as scan current passes through the red, green and blue vertical deflection coils, $V_R$, $V_G$ and $V_B$ (FIG. 4b-401).

This series of pulses is supplied to the non-inverting input terminal of the integrator formed by the second operational amplifier 54, while the inverting input terminal is biased by the third and fourth resistors R3 and R4 to around 1 volt, in a preferred embodiment. Thus, whenever the voltage at the non-inverting input terminal exceeds 1 volt (FIG. 4b-403), the integrator 54 begins to integrate positive (FIG. 4b-404) until the output voltage of the integrator 54 reaches a maximum voltage (FIG. 4b-405), and when the voltage at the non-inverting input terminal is below 1 volt, the output voltage of the integrator 54 begins to decay (FIG. 4b-406). The integration time constant of the integrator 54 is set to provide a ripple voltage at the output terminal of the integrator 54 having a minimum voltage which remains above 1.2 volts. The values for the biasing resistors for the transistor T1 are selected such that so long as the voltage at the output terminal of the integrator 54 remains above 1.2 volts (indicating vertical scan current at the sensing resistor $R_S$) the transistor T1 remains conductive, and if the voltage at the output terminal of the integrator 54 drops below 1.2 volts (indicating loss of vertical scan current at the sensing resistor $R_S$), the transistor T1 becomes non-conductive. One advantage to the vertical scan detector 50 illustrated in FIG. 2 is that no electrolytic capacitors are required, as in prior art circuits. Because electrolytic capacitors deteriorate due to heat and time, the illustrated vertical scan detector provides improved performance in the long term.

If an open circuit occurs in the feedback path of the vertical scan current amplifier 82, i.e. in the path in the feedback loop after the sensing resistor $R_S$ and containing the capacitor $C_V$, then no current will flow through the vertical deflection coils $V_R$, $V_G$ and $V_B$ because the current loop is broken. However, the vertical scan amplifier 82 produces a voltage at the sensing resistor $R_S$ in response to the vertical sawtooth signal VERT SAW. The differential amplifier formed by the first operational amplifier 52 provides some degree of common mode rejection signal. However, in practice the balance of the first operational amplifier 52 is not sufficiently perfect to completely reject this large common mode signal.

In the illustrated embodiment, the signal generated at the sensing resistor $R_S$ in the event of such a failure is a 26 volt peak-to-peak square wave 60 Hz signal (FIG. 4d-402). This square wave signal is not rejected by the amplifier 52, as described above, and causes the integrator 54 to provide a control signal to the transistor T1 conditioning it to remain conductive (indicative of proper vertical scan current) even though no scan current is flowing. To properly detect this failure, the illustrated embodiment includes a vertical feedback detector 60 (of FIG. 1).

Referring again to FIG. 2, in detector 60, embodying an inventive feature, the first electrode of the sensing resistor $R_S$ is also coupled to a first electrode of a resistor R11. A second electrode of the resistor R11 is coupled to an anode electrode of a diode D2. A cathode electrode of the diode D2 is coupled to a first electrode of a capacitor C3 and a cathode electrode of a Zener diode Z1. A second electrode of the capacitor C3 is coupled to ground. An anode electrode of the Zener diode Z1 is coupled to a first electrode of a resistor R12. A second electrode of the resistor R12 is coupled to a first electrode of a resistor R13 and the base electrode of the third transistor T3 of FIG. 3. A second electrode of the resistor R13 of FIG. 2 is coupled to ground.

Under proper operating conditions, signal at the sensing resistor $R_S$ voltage is a 3 volt, 60 Hz signal superimposed on a 13 volt DC signal (FIG. 4d-401), as described above. In operation, the voltage at the sensing resistor $R_S$ is peak detected by the combination of the diode D2 and capacitor C3. The peak detected signal is a DC signal of approximately 16 volts. Zener diode Z1 is a 20 volt Zener diode, and, thus, remains nonconductive under this condition. The base electrode of the transistor T3 of FIG. 3 is pulled to ground potential by resistor R13 of FIG. 2 and it remains non-conductive.

In the event of a failure of the feedback path containing the capacitor $C_V$, the resulting 26 volt square wave signal at the sensing resistor $R_S$ (FIG. 4d-402) is peak detected by the combination of resistor R11, diode D2 and capacitor C3 to a DC signal of approximately 26 volts. Zener diode Z1 becomes conductive in this case, and provides a 6 volt signal to the voltage divider formed by resistors R12 and R13. The voltage produced at the base electrode of the third transistor T3, of FIG. 3, is sufficient to condition the transistor T3 to become conductive. This, in turn, pulls the base electrode of the second transistor T2 to ground, conditioning the second transistor T2 to become non-conductive.

Advantageously, the vertical feedback detector 60 of FIG. 2, in combination with the vertical scan detector 50 detects both vertical scanning failure modes, and does not require electrolytic capacitors.

The collector of the transistor T1 of FIG. 3 is coupled to the scan loss input terminal of the control circuit 70 (of FIG. 1), and to a first electrode of a pull-up resistor R14 of FIG. 3. A second electrode of the pull-up resistor R14 is coupled to a source of operating potential, which in the illustrated embodiment is 10 volts. Thus, when the transistors T1 and T2 are conductive, and the transistor T3 is non-conductive, indicating proper operation, the voltage at the SCAN LOSS signal terminal is ground potential. When either of the transistors T1 and T2 are non-conductive, or the transistor T3 is conductive, indicating a loss of scanning, the signal at the SCAN LOSS signal terminal is pulled up by pull-up resistor R14.

FIG. 3 is a more detailed diagram of control circuit 70 of FIG. 1. In FIG. 3, those elements which are the same as those in FIGS. 1 and 2 are designated with the same reference numbers, and are not described in detail below. In FIG. 3, the horizontal pulse signal H PULSE (FIG. 5b) from the television front end 5 (of FIG. 1) is coupled to an anode electrode of a diode D3. A cathode electrode of the diode D3 is coupled to respective first electrodes of a resistor R15, a capacitor C4 and a resistor R16. Respective second electrodes of the resistor R15 and the capacitor C4 are coupled to ground. A second electrode of the resistor R16 is coupled a first electrode of a resistor R17 and a collector of an NPN scan loss inverter transistor T4. A second electrode of the resistor R17 is coupled to a base electrode of a PNP cascode mute switch transistor T5. An emitter electrode of the cascode mute switch transistor T5 is coupled to a source of operating potential, which in the illustrated embodiment is 10 volts, to a first electrode of a capacitor C5 and to a base electrode of an NPN cascode transistor T6. A second electrode of the capacitor C5 is coupled to ground A collector electrode of the cascode transistor T6 is coupled to the input terminal of the buffer amplifier 10. An emitter electrode of the cascode transistor T6 is coupled to a first electrode of an emitter resistor R18. A second electrode of the emitter resistor R18 is coupled to a collector electrode of the cascode mute switch transistor T5 and a first electrode of a resistor R19. A second electrode of the resistor R19 is coupled to a collector electrode of a video amplifying transistor T7. The video signal from the television front end 5 (of FIG. 1) is coupled to a base electrode of the video amplifying transistor T7. An emitter electrode of the video amplifying transistor T7 is coupled to a first electrode of an emitter resistor R20. A second electrode of the emitter resistor R20 is coupled to ground.

The portion of FIG. 2 generating the SCAN LOSS signal is illustrated in FIG. 3: e.g. the pull-up resistor R14, and the transistors T1, T2 and T3. The SCAN LOSS signal is coupled to a first electrode of a resistor R21. A second electrode of the resistor R21 is coupled to a base electrode of the scan loss inverter transistor T4 and to a first electrode of a resistor R22. A second electrode of the resistor R22 is coupled to ground. An emitter electrode of the scan loss inverter transistor T4 is coupled to ground.

In operation, the video signal from the television front end 5 (of FIG. 1) is amplified by a cascode amplifier formed by the video amplifying transistor T7 and the cascode transistor T6. This signal is coupled to the buffer amplifier 10. For example, the buffer amplifier may be a push pull amplifier of a known design, with an input terminal coupled to the cascode amplifier, all in a known manner.

The control circuit 70 also includes a second horizontal scan detector circuit. The H PULSE signal (FIG. 5b) is, as described above, a pulse signal having a voltage of around 25 volts during horizontal retrace (RT) periods and −5 volts otherwise. This signal is peak detected by the diode D3, resistor R15 and capacitor C4. When the horizontal pulse signal H PULSE is present, the voltage at the capacitor C4 is substantially 25 volts. If the horizontal pulse signal H PULSE is absent, or stops, the capacitor C4 is discharged to ground through the resistor R15. The signal at the capacitor C4 is coupled to the base electrode of the cascode mute switch transistor T5. The emitter electrode is coupled to a 10 volt operational power supply. When the base electrode is above 10 volts, (i.e. when the horizontal pulse signal H PULSE is present) the cascode mute switch transistor is non-conductive. In this case, the cascode amplifier, described above, operates normally. If, however, the base electrode of the cascode mute switch transistor is below 10 volts (i.e. when the H PULSE signal is absent) then the cascode mute switch becomes conductive. This couples the emitter electrode of the cascode transistor T6 to the same voltage as the base electrode, and the cascode transistor turns off. In this case, no video signal is supplied to the buffer amplifier 10 and the kinescope 20 is blanked.

The SCAN LOSS signal, which, as described above, is at ground potential under normal conditions, and is pulled to a higher level indicating the loss of horizontal or vertical scanning, is coupled to the base electrode of the scan loss inverter transistor T4. Under normal conditions, when the SCAN LOSS signal is at ground potential, the scan loss inverter signal is non-conductive, and the remainder of the control circuit 70 operates as described above. However, if the SCAN LOSS signal rises to the higher voltage, the scan loss inverter transistor T4 becomes conductive. This pulls the base of the cascode mute switch transistor T5 below 10 volts (regardless of the state of the H PULSE signal). This makes the cascode mute switch transistor T5 conductive, which in turn makes the cascode transistor T6 non-conductive. In this case, too, no video signal is supplied to the buffer amplifier 10, and the kinescope 20 is blanked.

What is claimed is:

1. A video display apparatus, comprising:
   a deflection amplifier responsive to an input signal at a frequency related to a deflection frequency for generating an output voltage coupled to a deflection winding to produce a deflection current that is capable of producing an electron beam in a cathode ray tube;
   a protection circuit responsive to a first scan loss indicative signal for disabling a corresponding stage when said first scan loss indicative signal is generated; and
   a first scan loss detector comprising a differential amplifier having a pair of input terminals coupled to a pair of terminals of a current sensing resistance that is coupled in a current path of said deflection current for generating said first scan loss indicative signal when a difference between signals developed in said pair of terminals is indicative that a magnitude of said deflection current is outside a normal operation range, said differential amplifier providing common mode rejection with respect to the signals that are developed in said pair of terminals of said current sensing resistance.

2. An apparatus according to claim 1, further comprising, a second scan loss detector that includes a peak detector for generating a second scan loss indicative signal when an amplitude of said output voltage is higher than in normal operation, said second scan loss indicative signal being coupled to said protection circuit for disabling said stage.

3. An apparatus according to claim 2 wherein said protection circuit is coupled to a video driver stage of said cathode ray tube for generating a blanking signal when one of said first and second scan loss indicative signals is generated.

4. An apparatus according to claim 3 wherein when a fault occurs in a feedback path of said amplifier that results in a scan loss, said output voltage has an amplitude that is greater than a normal operation amplitude and wherein said second scan loss detector comprises a peak rectifier and a filter capacitor for generating said second scan loss indicative signal at a constant direct current level.

5. An apparatus according to claim 2 wherein said second scan loss detector comprises a zener diode having a first terminal coupled to said output voltage for generating said second scan loss indicative signal at a second terminal of said zener diode when said zener diode is at a first state of conduction and for disabling the generation of said second scan loss indicative signal when said zener diode is at a second state of conduction.

6. An apparatus according to claim 2 wherein said protection circuit is coupled to an electrode of said cathode ray tube for generating a blanking signal, when one of said first and second scan loss indicative signals is generated.

7. An apparatus according to claim 2, wherein said impedance comprises, a current sensing resistor coupled in a current path of said deflection current for generating a feedback signal that is coupled to an input of said deflection amplifier, wherein when, in a fault condition, said resistor is disconnected from said deflection current path, an amplitude of said output voltage is larger than in its normal operation amplitude and said second scan loss indicative signal is generated.

8. An apparatus according to claim 1 wherein said deflection amplifier generates a vertical deflection current.

* * * * *